US009623558B1

(12) United States Patent
Stubbs et al.

(10) Patent No.: US 9,623,558 B1
(45) Date of Patent: Apr. 18, 2017

(54) TIME-OF-FLIGHT LOCALIZATION (71) Applicant: Amazon Technologies, Inc., Seattle, WA (US)

(72) Inventors: Andrew Stubbs, Waltham, MA (US); Jonathan Evan Cohn, Winchester, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/574,084

(22) Filed: Dec. 17, 2014

(51) Int. Cl.
*G06F 17/00* (2006.01)
*B25J 9/16* (2006.01)
*B25J 5/00* (2006.01)

(52) U.S. Cl.
CPC ............... *B25J 9/1666* (2013.01); *B25J 5/00* (2013.01); *B25J 9/162* (2013.01); *Y10S 901/01* (2013.01)

(58) Field of Classification Search
CPC .... G05D 1/028; G05D 1/0227; G05D 1/0274; G05D 2201/0206; G05D 1/0225; G05D 1/0238; G05D 1/024; G05D 1/0242; G05D 1/0246; G05D 1/0255; G05D 2201/0203; G05D 1/0261; G05D 1/0022; G05D 1/0272; B25J 9/1666; B25J 5/00; B25J 9/162

USPC ................ 701/2; 180/23; 340/1.1, 10.1–10.6
See application file for complete search history.

(56) References Cited

U.S. PATENT DOCUMENTS

| 8,725,416 | B2* | 5/2014 | Choi | G01S 5/0284 |
| | | | | 701/300 |
| 8,797,141 | B2* | 8/2014 | Best | G01S 1/68 |
| | | | | 340/572.1 |
| 2014/0361077 | A1* | 12/2014 | Davidson | G06Q 10/08 |
| | | | | 235/385 |

* cited by examiner

*Primary Examiner* — Muhammad Shafi
(74) *Attorney, Agent, or Firm* — Lee & Hayes, PLLC

(57) ABSTRACT

Robotic units may operate in a workspace that is shared with human workers. In order to safeguard the workers, operation of a robotic unit may be inhibited when a worker is near the robotic unit. In order to determine the position of the worker and thereby determine the proximity of the worker and the robotic unit, a time-of-flight measurement is performed to determine the distance of the worker from each of multiple reference locations within or about the workspace. A circular bounding area is defined around each reference location based on the determined distances. A bounded position area is identified as the intersection of the circular bounding areas. The worker is then indicated as being within the bounded position area.

20 Claims, 5 Drawing Sheets

TIME-OF-FLIGHT LOCALIZATION

BACKGROUND

An industrial robot is an electro-mechanical machine that is controlled by a computer program, electronic circuits, or both. The industrial robot may be either stationary or mobile (e.g., capable of navigating from one location to another location). For example, the industrial robot may have wheels (or another form of conveyance) to enable the industrial robot to navigate to different locations. Industrial robots that can navigate independently of each other may be referred to as unmanned drive units. An industrial robot may be capable of performing activities using one or more arm-like mechanisms to grasp an item, release the item, etc. Based on the type of task that is to be performed, two or more robots may coordinate their respective activities to perform a task.

Humans may at times enter the areas in which industrial robots are operating. Similarly, an unmanned drive unit may enter an area in which a person is working. When a person and a robotic unit operate in proximity to each other, the person may be inadvertently struck and injured by movement of the robotic unit. Accordingly, it is desirable to implement safety systems to inhibit the movement of industrial robots when a person is nearby.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

The systems and techniques described herein may be used to provide a functionally safe environment for human workers in a workspace in which robotic units are performing activities. For example, when a human is detected within a certain distance of a robotic unit, the robotic unit may be instructed to temporarily cease movement to avoid the potential for injury to the human.

In a described implementation, a system controller continuously monitors the positions of persons within the workspace. The system controller may include or utilize a time-of-flight (ToF) position monitoring system that measures flight times of radio-frequency (RF) signals between a person and each of multiple reference locations to determine a bounded position area within which the person is presumed to be positioned. In order to provide functional safety, it is assumed that the person may be at any point within the bounded position area.

The ToF position monitoring system uses reference radios located respectively at each of the reference locations. A person within the workspace wears a portable radio. Each reference radio is configured to communicate with the portable radio to measure a round-trip flight time of an RF signal between the corresponding reference location and the person. The signal flight time is then converted to a distance, based on the known propagation speed of electromagnetic waves. In order to account for multi-path measurement errors, the measured distance is considered to be the maximum possible distance of the person from the reference location; it is assumed that the actual distance of the person from the reference location is less than or equal to the maximum possible distance.

The ToF position monitoring system constructs circular bounding areas corresponding respectively to each of the reference locations. Each circular bounding area is centered on the corresponding reference location and has a radius equal to the maximum possible distance of the person from the reference location. The ToF position monitoring system then determines the intersection of the circular bounding areas corresponding to the multiple reference locations. The intersection of the bounding areas is referred to herein as a bounded position area. The portable radio and the person carrying the portable radio are assumed to be within this area. Any robotic unit within a predetermined distance of the bounded position area or within the bounded position area is instructed to inhibit its movement in order to prevent potential injury to the person.

Figure 1:
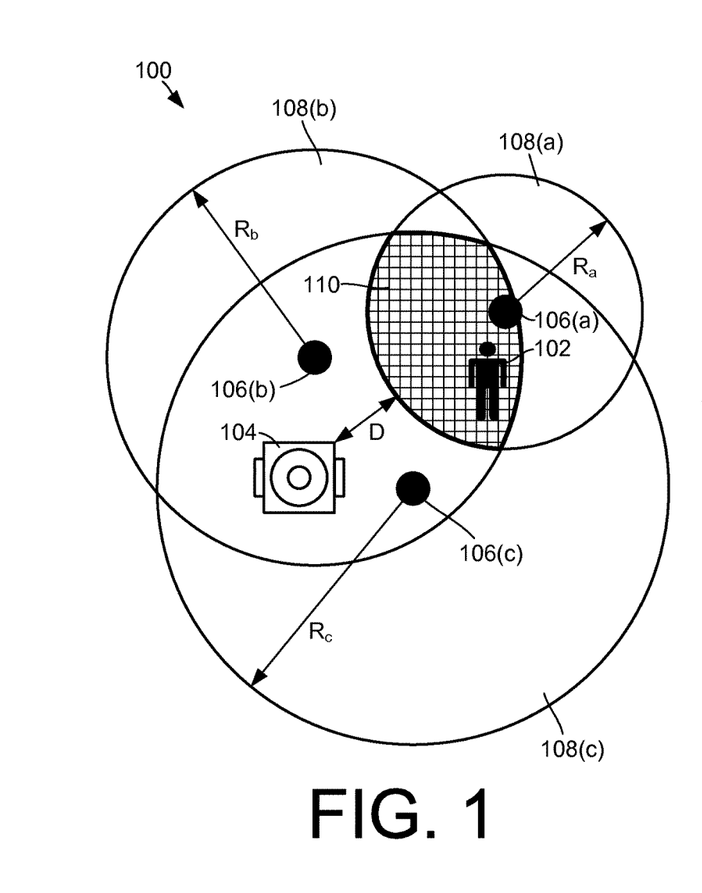
FIG. 1 is a diagram illustrating a technique for determining the proximity of a person to a robotic unit within a shared workspace.

FIG. 1 shows a workspace 100 that contains a person 102 and a robotic unit 104. The robotic unit may in some environments comprise a wheeled vehicle or other propelled device that operates autonomously, without direct human guidance. For example, the robotic unit 104 may comprise an unmanned drive unit that navigates through the workspace 100 based on internal logic, information derived from sensors, and/or instructions received from a supervisory controller.

The person 102 may also move throughout the workspace 100 and may potentially move nearby or into the path of the robotic unit 104. In many situations, the robotic unit 104 may be large enough to cause significant injury should it collide with the person 102. Accordingly, the supervisory controller tracks the position of the person 102 and shuts down or otherwise inhibits operation of the robotic unit 104 whenever the person 102 and the robotic unit 104 are in the same vicinity.

In order to determine the position of the person 102, the system uses RF time-of-flight (ToF) measurements to determine the maximum possible distance R between each of multiple reference locations 106 and the person 102. ToF measurement involves determining the flight time of an RF signal between two points. The flight time is converted to a distance by multiplying the flight time by a constant corresponding to the known propagation speed of electromagnetic waves. In certain embodiments, a round-trip flight time is determined and divided by two to determine a one-way flight time. The one-way flight time is then multiplied by the known propagation speed of electromagnetic waves to determine the distance.

After determining the flight times and maximum possible distances R corresponding respectively to the reference locations 106, a circular bounding area 108 is constructed for each reference location 106. Each circular bounding area 108 is centered about a corresponding reference location 106. Each circular bounding area 108 has a radius equal to or greater than the maximum possible distance R between the corresponding reference location 106 and the person 102, as determined by the ToF measurements.

An observed ToF signal between two points may traverse multiple paths. This phenomenon is referred to as multi-path signal propagation and it can affect ToF measurements. Generally, it is desired to measure the flight time of a signal that has followed a direct path between the two points. However, it can be difficult to determine which of multiple received signals corresponds to the direct path. Thus, in some cases measurements may erroneously be based on signals arriving from longer, indirect paths, resulting in erroneous measured distances that are larger than the actual distances between the two points. However, multi-path signal propagation measurements cannot result in distances that are smaller than the actual distances. Thus, the distance R measured using ToF techniques may be considered to be the maximum possible distance between the two points. In the described environment, therefore, the person 102 can be considered to be within each of the bounding areas 108.

FIG. 1 illustrates a workspace utilizing three reference locations 106(a), 106(b), and 106(c), having respectively corresponding bounding areas 108(a), 108(b), and 108(c). The bounding areas 108 have respective radii $R_a$, $R_b$, and $R_c$.

An intersecting area 110, also referred to herein as a bounded position area 110, is constructed as the intersection of the bounding areas 108. The bounded position area 110 is hatched in FIG. 1 for emphasis. Because of the characteristics of ToF measurements described above, it may be presumed that the person 102 is somewhere within the bounded position area 110.

A workspace controller is configured to monitor the distance D of the robotic unit 104 from the bounded position area 110. When the distance D is less than a predetermined threshold distance or the robotic unit 104 is inside the bounded position area 110, further movement of the robotic unit 104 is inhibited to prevent accidental collision with or injury to the person 102. Movement of the robotic unit 104 may be resumed when the distance D increases to a value that is greater than the threshold. In some cases, inhibiting movement of the robotic unit 104 may comprise slowing the movement of the robotic unit 104 to a safe speed when the robotic unit 104 is near or within the bounded position area. In some cases, inhibiting the movement of the robotic unit 104 may comprise causing the robotic unit 104 to detour around that bounded position area 110 rather than simply stopping.

In some cases, behavior and activities of the robotic unit 104 may be inhibited in different ways depending on the distance from the bounded position area. For example, the movement of the robotic unit may be slowed when the robotic unit is within a first distance of the bounded position area 110 and stopped when within a second, smaller distance of the bounded position area 110.

In some embodiments, a system controller may instruct the robotic unit 104 to stop when the system detects that the robotic unit 104 is in proximity to the person 102. In other embodiments, the robotic unit 104 may periodically query the system controller to receive continuing authorization for movement. If such authorization is not received, the robotic unit may stop its movements or other operations. In yet other embodiments, the system controller may be configured to periodically provide authorization for movement of the robotic unit 104. If the robotic unit 104 does not receive a new authorization within any given time period, the robotic unit 104 may cease its operations or may otherwise inhibit its operations.

Figure 2:
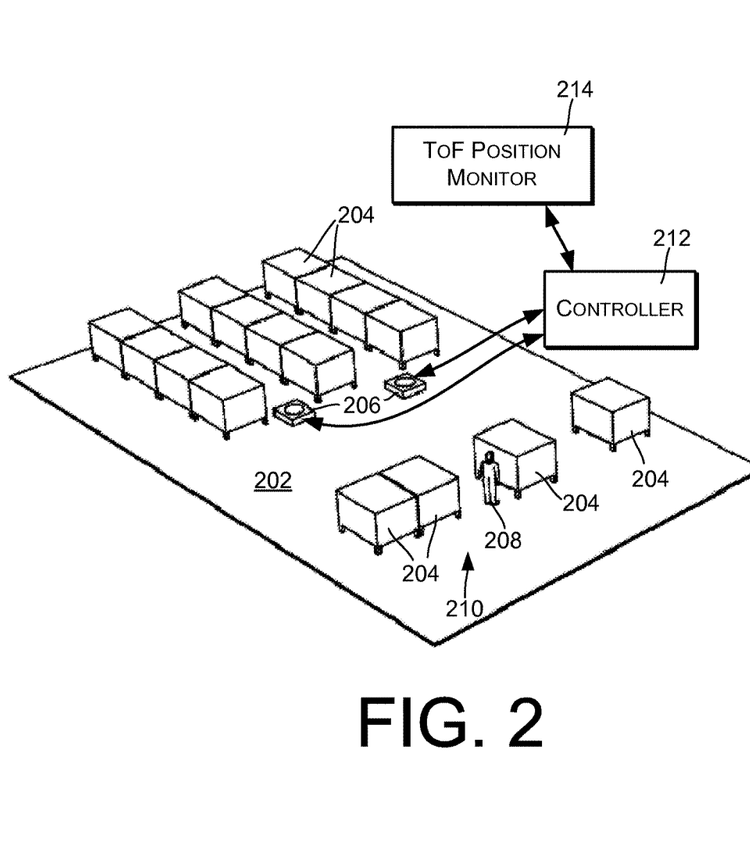
FIG. 2 is a schematic perspective diagram of a workspace in which an inventory storage and order fulfillment system is implemented.

FIG. 2 illustrates components of a workspace 202 in which the position detection system described herein may be used. In this example, the workspace 202 is used to store inventory items that are ordered by and shipped to customers or other entities. In the described embodiment, the workspace 202 uses an automated robotic order fulfillment system in which inventory items are stored in portable inventory holders 204 and moved about the workspace 202 by unmanned robotic drive units 206. For example, the inventory holders 204 may be moved to a human worker 208 so that the worker can manually retrieve or "pick" ordered items from the inventory holders 204 under the direction of the order fulfillment system.

As a specific example, a received order may specify a plurality of inventory items. In response to such an order, the inventory holders 204 containing the inventory items may be moved by the robotic drive units 206 to a workstation or other area 210 nearby the worker 208. At the workstation 210, the worker 208 may be directed by the order fulfillment system to retrieve certain inventory items that have been ordered. In certain embodiments, the ordered items or the locations of the ordered items on the inventory holders 204 may be listed or visually indicated so that the worker 208 knows which items to retrieve. As an example, locations on the inventory holders 204 may be indicated by illumination, such as laser illumination, to show the worker 208 the locations from which to retrieve items. As yet another example, the inventory holder 204 may have integral indicators or readouts that are controlled to inform the worker 208 regarding the locations from which ordered inventory items are to be retrieved.

In some implementations, inventory items retrieved in this manner may be placed on an additional inventory holder 204 that contains one or more outgoing orders. Once completed, the additional inventory holder 204 may be moved by an unmanned robotic drive unit 206 to a shipping workstation or other processing point.

As another example, inventory restocking may be performed when receiving new inventory. The order fulfillment system identifies one or more inventory holders 204 that are to be used for storage of the incoming inventory items. The robotic drive units 206 bring the identified inventory holders 204 to the worker 208 at the location of the new inventory items. The worker 208, under the direction of the order fulfillment system, can then load the new inventory items onto the inventory holders 204 at locations specified by the order fulfillment system. After being loaded, the robotic drive units 206 may be used to move the inventory holders 204 to appropriate locations within the workspace 202, from where they may be retrieved for later use in fulfilling future orders.

The robotic drive units 206 move the inventory holders 204 between locations within the workspace 202 under the general direction and control of a controller 212, which is also referred to herein as control logic 212. The controller 212 keeps track of the inventory holders 204 and their locations within the workspace 202. In addition, the controller 212 monitors inventory of the inventory facility, keeps track of the inventory items held by each of the inventory holders 204, keeps track of the specific locations of inventory items within the inventory holders 204, and/or keeps track of the robotic drive units 206 within the workspace 202.

In certain implementations, the workspace 202 may include a number of fiducial marks on the floor of the workspace 202. The fiducial marks are positioned to correspond to points of a two-dimensional grid that covers all or a portion of the floor of the workspace 202 The robotic drive units 206 in such implementations may include positioning sensors configured to detect the fiducial marks. The fiducial marks may be used to indicate positions of the robotic drive units 206 within the workspace 202, and may be used by the robotic drive units 206 to navigate through the workspace 202. The robotic drive units 206 may report their positions to the controller 212 periodically and/or in response to queries by the controller 212.

The controller 212 assigns tasks to the robotic drive units 206 and other components of the system and coordinates operation of the robotic drive units 206 in completing the tasks. The controller 212 also supervises or directs manual operations, such as by indicating which items of an inventory holder 204 are to be selected or "picked" by a worker, and where the selected items are to be placed (such as at a specified location in another inventory holder).

The robotic drive units 206 may comprise any devices or components appropriate for use in the system based on the characteristics and configuration of the inventory holders 204 and/or other elements of the system. In a particular embodiment, the robotic drive units 206 are self-powered, wheeled devices configured to move autonomously about the workspace 202 without direct human supervision. In general, the robotic drive units 206 may be powered, propelled, and controlled in any manner appropriate based on the configuration and characteristics of the system.

The robotic drive units 206 may be capable of communicating with the controller 212 to receive information identifying selected inventory holders 204, to transmit the locations of the robotic drive units 206, and/or to exchange any other suitable information to be used by the controller 212 or the robotic drive units 206 during operation. The robotic drive units 206 may communicate with the controller 212 wirelessly or in any other appropriate manner. As one example, particular embodiments of the robotic drive unit 206 may communicate with the controller 212 and/or with one another using 802.11, Bluetooth, or Infrared Data Association (IrDA) standards, or any other appropriate wireless communication protocol.

The controller 212 may include or may utilize a ToF position monitoring system 214 that monitors the positions of human workers 208 in the workspace 202. The ToF position monitoring system 214 communicates with portable communication devices carried by the workers 208 to determine a bounded position area of each worker 208. A bounded position area is an area that has been ascertained as containing the worker 208. The controller 212 is responsive to position information provided by the position monitoring system 214 to inhibit movement of the robotic drive units when they are near the bounded position area of any worker 208.

In an example implementation, a system such as described herein may be implemented by a mail or online order warehouse facility and inventory items may comprise merchandise stored in the warehouse facility. During operation, the robotic drive units 206 may retrieve inventory holders 204 containing one or more inventory items requested in an order to be packed for delivery to a customer. Moreover, in particular embodiments boxes containing completed orders may themselves represent inventory items.

As another example, a system may be implemented by a merchandise-return facility. In such an embodiment, inventory items may represent merchandise returned by customers. Units of these inventory items may be stored in the inventory holders 204 when received at the workspace 202. At appropriate times, a large number of units may be removed from a particular inventory holder 204 and packed for shipment back to a warehouse or other facility. For example, individual units of a particular inventory item may be received and stored in the inventory holders 204 until a threshold number of units of that inventory item have been received. The robotic drive units 206 may then be tasked with retrieving an inventory holder 204 in this state. The inventory holder 204 may then be shipped to another facility, such as a mail-order warehouse.

As another example, a system may be implemented by an airport luggage facility. In such an embodiment, inventory items may represent pieces of luggage stored in the luggage facility. The robotic drive units 206 may retrieve inventory holders storing luggage that is arriving and/or departing on particular flights or luggage that is destined for particular types of processing, such as x-ray or manual searching. The system may be similarly implemented within duties or customs facilities for tracking and transferring freight items.

As yet another example, a system may be implemented by a manufacturing facility, and inventory items may represent individual components of a manufacturing kit. More specifically, inventory items may represent components intended for inclusion in an assembled product, such as electronic components for a customized computer system. In such an embodiment, the system may retrieve particular components identified by a specification associated with an order for the product so that a customized version of the product can be built.

Figure 3:
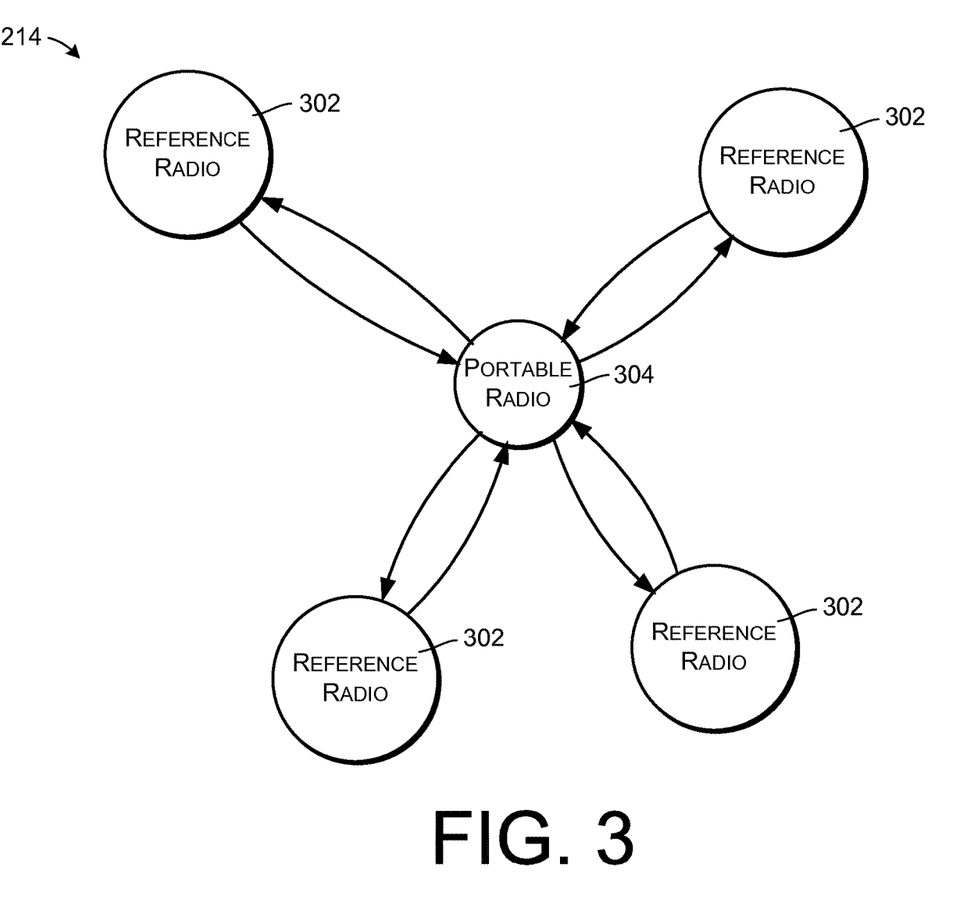
FIG. 3 is a block diagram illustrating components of a time-of-flight position monitor such as may be used in the workspace of FIG. 2.

FIG. 3 illustrates components of the position monitoring system 214 in an example implementation. The position monitoring system 214 comprises multiple reference radios 302 that are positioned respectively at corresponding reference locations within or about the workspace 202. The position monitoring system 214 also includes one or more portable radios 304 that are carried by persons who are in or who may enter the workspace 202.

Each reference radio 302 is configured to communicate with the portable radio 304 to determine a distance between the reference radio 302 and the portable radio 304. The radios 302 and 304 may be configured to communicate using ultra-wideband (UWB) communications technologies and protocols that are designed for distance ranging. As an example, the radios 302 and 304 may communicate using a communications protocol as defined by the IEEE 802.15.4a standard, which relates to the use of direct sequence UWB for ToF distance ranging. As another example, the radios 302 and 304 may communicate and perform distance ranging using one or more variations of the IEEE 802.11 wireless communications protocol, which may at times be referred to as Wi-Fi®. Using Wi-Fi for distance ranging may be desirable in environments where Wi-Fi is already being used, in order to avoid having to install additional hardware. Distance ranging may be implemented within one of the communications layers specified by the 802.11 protocol, such as the TCP (Transmission Control Protocol) layer, the UDP (User Datagram Protocol) layer, or another layer of the 802.11 protocol stack.

Generally, the reference radio 302 sends a wireless communication signal or packet to the portable radio 304, while noting the time that the signal is transmitted. The portable radio 304 receives the signal or packet and provides a responsive wireless communications signal or packet back to the reference radio 302 after a predetermined response delay from receiving the signal provided by the reference radio 302. The reference radio 302 receives the responsive signal and notes the time at which the responsive signal is received. The noted transmit time and the predetermined response delay are subtracted from the noted receive time to generate the round-trip flight time. The round-trip flight time is divided by 2 to determine the one-way flight time. The one-way flight time is multiplied by the propagation speed of electromagnetic waves to produce the distance between the reference radio 302 and the portable radio 304. Each of the reference radios 302 communicates with the portable radio 304 in this manner to produce a respective maximum possible distance between the reference radio 302 and the portable radio 304.

The calculations described above may be performed by the reference radios 302, by processing logic associated with the reference radios 302, and/or by the controller 212.

Techniques and protocols other than those described above may be used to perform ToF measurements. For instance, some embodiments may use one-way ToF measurements to determine maximum possible distances between the reference radios 302 and the portable radio 304.

FIGS. 4A-4D illustrate the use of different numbers of reference radios to determine the bounded position area 110. Generally, increasing the number of reference radios within the workspace 202 decreases the size of the bounded position area 110 and thus indicates the position of the person 102 at a higher degree of resolution. A particular workspace 202 may be fitted with a number of reference radios 302 that will result in a desired resolution and/or size of the bounded position area 110. In some cases, however, one or more of the reference radios 302 may be unable to produce a ToF measurement, thereby resulting in an increased size of the bounded position area 110.

Figure 4A:
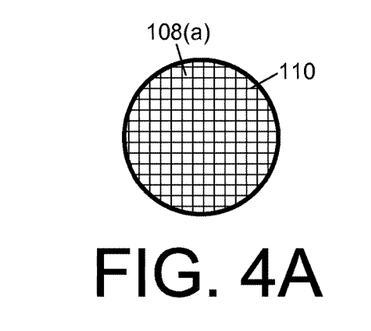
FIGS. 4A-4D are diagrams illustrating the identification of bounded position areas based on different numbers of reference locations and corresponding reference radios.

FIG. 4A shows a situation in which only a single reference radio 302 has been able to produce a ToF measurement to a detected portable radio 304. Specifically, the reference radio at the reference location 106(a) has produced a ToF measurement, resulting in the circular bounding area 108(a). Because only one circular bounding area 108(a) has been defined, the bounded position area 110 corresponds to the entire circular bounding area 108(a). Movement and/or any other potentially dangerous operation of equipment within or near the circular bounding area 108(a) will be ceased or inhibited.

Figure 4B:
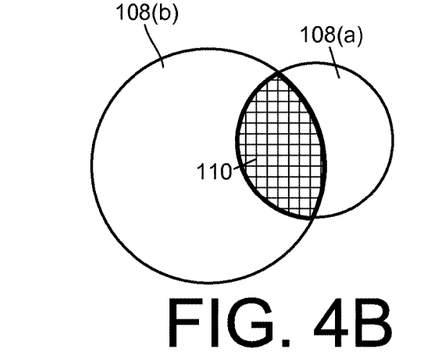

FIG. 4B shows a situation in which two reference radios 302 have produced ToF measurements to a detected portable radio 304. Specifically, the reference radios at the reference locations 106(a) and 106(b) have produced ToF measurements, resulting in the circular bounding areas 108(a) and 108(b). In this case, the bounded position area 110 is the intersection of the circular bounding areas 108(a) and 108(b). Movement and/or any other potentially dangerous operation of equipment within or near the bounded position area 110 will be ceased or inhibited.

Figure 4C:
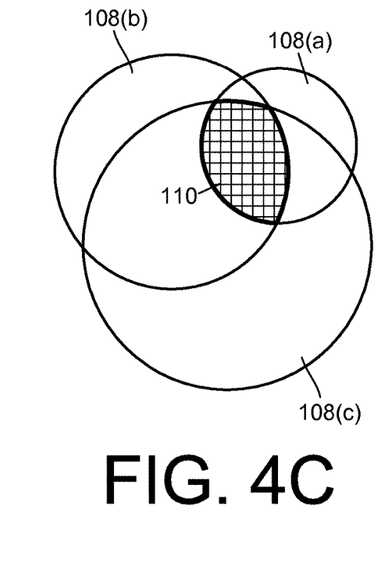

FIG. 4C shows a situation in which three reference radios 302 have produced ToF measurements to a detected portable radio 304. Specifically, the reference radios at the reference locations 106(a), 106(b), and 106(c) have produced ToF measurements, resulting in the circular bounding areas 108(a), 108(b), and 108(c). In this case, the bounded position area 110 is the intersection of the circular bounding areas 108(a), 108(b), and 108(c). Movement and/or any other potentially dangerous operation of equipment within or near the bounded position area 110 will be ceased or inhibited.

Figure 4D:
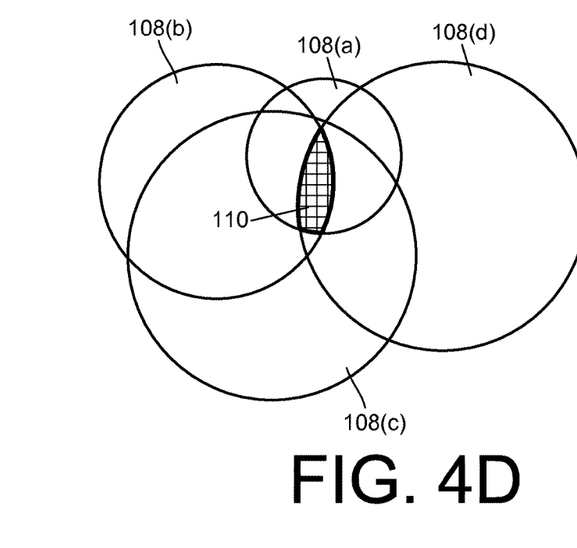

FIG. 4D shows a situation in which an additional, fourth reference radio 302 has produced a ToF measurement to a detected portable radio 304, resulting in a fourth circular bounding area 108(d). In this case, the bounded position area 110 is the intersection of the circular bounding areas 108(a), 108(b), 108(c), and 108(d). Movement and/or any other potentially dangerous operation of equipment within or near the bounded position area 110 will be ceased or inhibited.

As is apparent from FIGS. 4A-4D, failure of one or more reference radios to produce a ToF measurement to a detected portable radio 304 does not render the overall system unusable or unsafe. Instead, available ToF measurements, produced by remaining reference radios, may be used to produce the bounded position area 110, which simply increases in size as the number of available ToF measurements decreases.

The controller 212 and the associated robotic drive units 206 may be configured so that their operation and/or movement are conditioned upon the availability of at least one ToF measurement to a detected portable radio 304 known to be present in the workspace 202. In situations where none of the reference radios 302 are able to produce a ToF measurement to a detected portable radio 304, the operation and/or movement of all robotic drive units 206 may be ceased or otherwise inhibited, regardless of the locations of the robotic drive units 206.

The controller 212 may in some cases determine that one or more of the reference radios are not able to determine flight times. In this situation, the bounding areas correspond to the locations of the reference radios that have been able to determine flight times. As the number of available flight times decreases, the bounded position area becomes increasingly larger.

Figure 5:
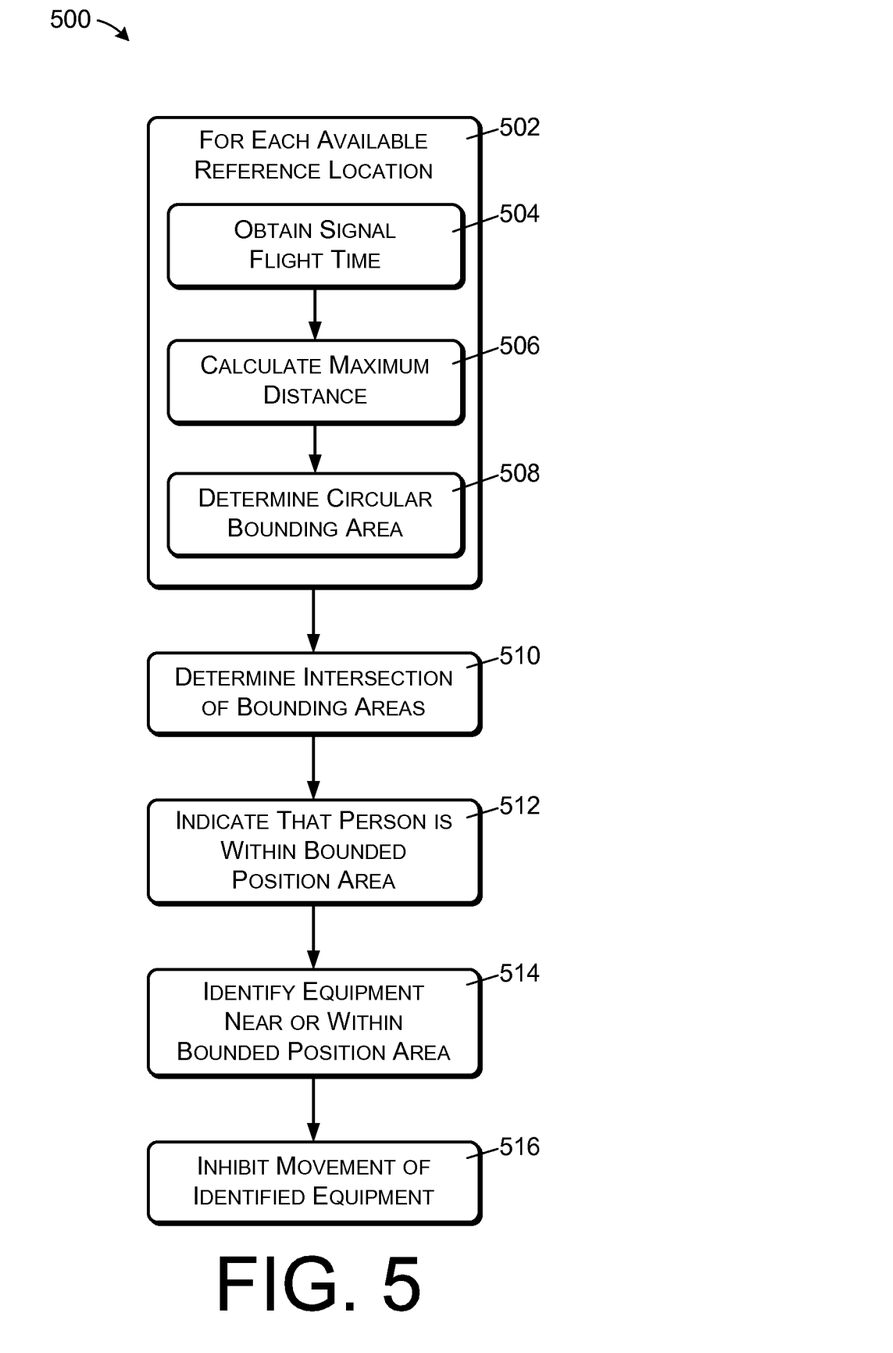
FIG. 5 is a flow diagram illustrating an example technique for determining a bounded position area of a worker and for protecting the worker from injury by nearby equipment.

FIG. 5 illustrates a method 500 of operating equipment within a workspace that is shared with human operators or workers. The method 500 may be performed in an environment such as described above, where the equipment comprises robotic drive units or other robotic equipment. The robotic equipment may move about the workspace as in the environment described above or may operate at fixed locations in the workspace. Individual actions of the method 500 may be performed by the controller 212, the ToF position monitoring system 214, one or more of the robotic units 206, and/or by other components of a particular installation.

The method 500 may also be performed in environments having other types of equipment that may endanger a user when the user is near the equipment. For example, certain types of equipment may emit harmful energy such as heat, radiation, fluids, light, etc., and it may be desired to inhibit the operation of such equipment when a user is nearby.

Each block of FIG. 5 represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes.

The workspace is equipped with multiple reference radios at corresponding known reference locations. Each worker carries a portable radio. The reference radios and portable radios may be configured as described above to produce ToF measurements representing the distance between each reference location and at least one of the workers carrying a portable radio.

A set of actions 502 is performed for each reference location for which the corresponding reference radio is able to perform a ToF measurement. In some situations, a particular reference radio may be unable to produce a ToF measurement. For example, the signal may be subject to electromagnetic interference that makes it impossible for the reference radio to communicate with the portable radio. As another example, walls or other obstructions may prevent signal propagation between the reference radio and the portable radio. As yet another example, the distance between the reference radio and the portable radio may be too great for radio communications.

An action 504 comprises determining a signal flight time between the reference radio and the portable radio. The signal flight time may be measured as described above using precision UWB ranging capabilities that are enabled by the IEEE 802.15.4a communications protocol or other communication protocol that provides distance ranging capabilities. Alternatively, wireless networking protocols such as defined by versions of IEE 802.11 may be used to perform distance ranging. As already described, such ToF measurements may be affected by multiple signal paths between the reference radio and the portable radio.

In the described embodiment, each ToF measurement is of a round-trip propagation time of a signal between the reference radio and the portable radio. In other embodiments, however, one-way propagation times may be measured. Furthermore, various different techniques, protocols, and/or standards may be used to communicate between the reference radio and the portable radio and to measure the flight time between the reference radio and the portable radio.

An action 506 comprises calculating a maximum possible distance of the portable radio from the location of the reference radio based at least in part on the measured flight time between the portable radio and the reference radio. Generally, this comprises dividing a round-trip flight time by two to produce a one-way flight time and multiplying the one-way flight time by a constant corresponding to the known propagation speed of electromagnetic waves.

An action 508 comprises determining a circular bounding area corresponding to the location of the reference radio. The circular bounding area is centered on the location of the reference radio and has a radius that is at least as great as the calculated maximum possible distance of the portable radio from the location of the reference radio.

Having identified a circular bounding area for each of the locations for which a ToF measurement is available, an action 510 comprises determining a bounded position area within which the portable device is presumed to be located. The action 510 comprises calculating the intersection of the circular bounding areas identified in the action 508 for each available reference location.

An action 512 comprises determining and providing an indication of the bounded position area, indicating that the portable device and the worker carrying the portable device may be anywhere within the bounded position area.

An action 514 comprises identifying equipment that is near or within the bounded position area. The action 514 may comprise identifying equipment that is within the bounded position area or within a predetermined distance of the bounded position area. The action 514 may comprise, for example, determining that a particular unmanned drive unit is within a predetermined distance of the bounded position area or inside the bounded position area. As another example, the action 514 may comprise determining that other potentially dangerous equipment is near the user.

An action 516 comprises inhibiting movement of any equipment that is identified as being within the predetermined distance of the bounded position area or inside the bounded position area. For example, the action 516 may comprise inhibiting movement or other operation of any unmanned drive unit that is within the predetermined distance of the bounded position area or inside the bounded position area to prevent a collision by the unmanned drive unit with the worker. Inhibiting the operation of equipment may involve different measures, depending on the type of equipment. In the case of an unmanned drive unit, the drive unit may be slowed, stopped, or detoured. In the case of other moving equipment, such as stationary equipment having moving members or parts, the movement of the members or parts may be slowed, limited, or stopped. In the case of equipment that emits potentially harmful energy such as heat, radiation, fluid, light, etc., the equipment may be controlled to reduce or eliminate the emitted energy.

Figure 6:
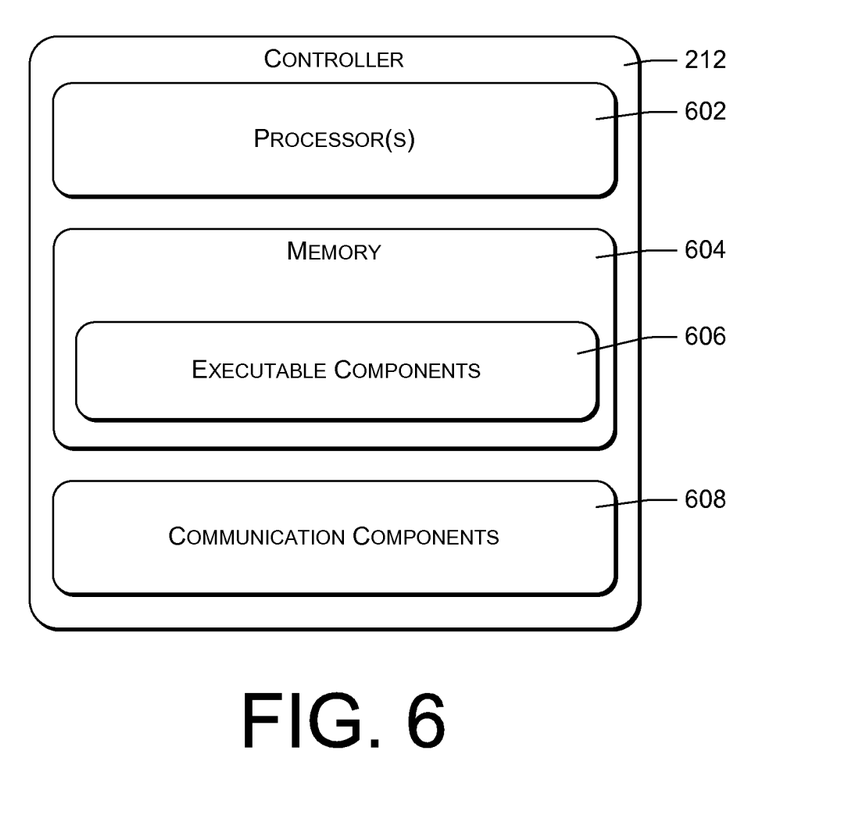
FIG. 6 is a block diagram illustrating example components of a controller that may be used to perform and/or coordinate the techniques described herein.

FIG. 6 shows relevant operational components of an example controller 212 that may be used in conjunction with the techniques and systems described above. In a very basic configuration, an example controller 212 may have control logic in the form of one or more processors 602 and memory 604. Depending on the configuration of the controller 212 and its control logic, the memory 604 may be a type of computer storage media and may include volatile and non-volatile memory. Thus, the memory 604 may include, but is not limited to, RAM, ROM, EEPROM, flash memory, or other memory technology.

The memory 604 may be used to store any number of executable components 606 that are executable by the processor(s) 602. In many embodiments, these executable components comprise instructions or programs that are executable by the processor(s) 602, and that when executed implement operational logic for performing the actions and functions described above.

Executable components stored in the memory 604 may be configured to manage multiple robotic units. For example, the controller 212 may specify instructions, locations, paths, inventory holders, and other information to the robotic drive units. In addition, the controller 212 may implement a database or other type of logic for managing inventory items and their storage within an inventory facility. In some embodiments, the controller 212 may be configured to coordinate and direct all or most automated activities relating to robotic drive units and associated inventory holders.

The controller 212 may have communication components 608 such as wireless networking components or other components for providing wireless communications between robotic drive units and the controller 212.

The controller 212 may of course include many other elements, components, and functionalities that are not specifically illustrated.

Although the subject matter has been described in language specific to certain features, it is to be understood that the subject matter defined in the appended claims is not necessarily limited to the specific features described. Rather, the specific features are disclosed as illustrative forms of implementing the claims.

What is claimed is:
1. A system, comprising:
multiple reference radios at respective known locations;
a portable radio;

each reference radio being configured to communicate with the portable radio to determine a signal flight time between the portable radio and the reference radio; and
control logic configured to perform actions comprising:
calculating, at a first time, a maximum possible distance of the portable radio from the respective location of each reference radio based at least in part on the signal flight time between the portable radio and the reference radio;
determining multiple bounding areas, wherein each bounding area is centered on a corresponding one of the respective locations of the multiple reference radios and has a radius that is at least as great as the calculated maximum possible distance of the portable radio from the corresponding one of the respective locations;
determining an intersecting area of the multiple bounding areas; and
determining, at or near the first time, that the portable radio is located at any position within the intersecting area.

2. The system of claim 1, wherein each signal flight time comprises a round-trip flight time.

3. The system of claim 1, wherein each reference radio is configured to communicate with the portable radio using an ultra-wideband communications protocol or a Wi-Fi communications protocol to determine the signal flight time between the portable radio and the reference radio.

4. The system of claim 1, the actions further comprising:
determining that a first reference radio of the reference radios is not able to determine the signal flight time between the portable radio and the first reference radio; and
wherein the multiple bounding areas correspond to the respective locations of one or more second reference radios other than the first reference radio.

5. The system of claim 1, wherein:
the portable radio is carried by a person within a workspace;
the actions further comprising:
identifying equipment that is within a predetermined distance of the intersecting area or inside the intersecting area; and
providing instructions to inhibit operation of the identified equipment to safeguard the person.

6. The system of claim 1, wherein the portable radio is configured to receive a first signal from one of the reference radios and to provide a second signal to said one of the reference radios after a predetermined response delay from receiving the first signal.

7. The system of claim 1, wherein calculating the maximum possible distance of the portable radio from the location of each reference radio comprises multiplying the signal flight time by the propagation speed of electromagnetic waves.

8. A method, comprising:
receiving, by a portable radio, a first signal from multiple reference radios at respective locations;
transmitting a second signal from the portable radio to the multiple reference radios;
determining, with a control logic, a signal flight time between the portable radio and each of the multiple reference radios;
calculating, at a first time with the control logic, a distance of the portable radio from the respective location of each reference radio based at least in part on the signal flight time between the portable radio and the reference radio;
determining, with the control logic, one or more bounding areas, wherein each bounding area is centered on a corresponding one of the respective locations and has a radius that is at least as great as the calculated distance of the portable radio from the corresponding one of the respective locations;
determining, with the control logic, an intersecting area of the one or more bounding areas; and
determining, at substantially the first time with the control logic, that the portable radio is located at any position within the intersecting area.

9. The method of claim 8, wherein determining the signal flight time with the control logic comprises communicating with the portable radio using an ultra-wideband communications protocol or a Wi-Fi communications protocol.

10. The method of claim 8, further comprising:
determining, with the control logic, that a first reference radio of the multiple reference radios is not able to at least one of: (1) send the first signal to the portable radio or (2) receive the second signal from the portable radio; and
wherein the one or more bounding areas correspond to the respective locations of one or more second reference radios other than the first reference radio.

11. The method of claim 8, further comprising:
identifying equipment, with the control logic, that is within a predetermined distance of the intersecting area or inside the intersecting area; and
providing instructions from the control logic to the identified equipment to inhibit operation of the identified equipment.

12. The method of claim 8, wherein the portable radio is configured to receive the first signal from one of the reference radios and to transmit the second signal to said one of the reference radios after a predetermined response delay from receiving the first signal.

13. The method of claim 8, wherein calculating the distance from the portable radio to the respective location of each reference radio comprises multiplying the signal flight time by the propagation speed of electromagnetic waves.

14. A method, comprising:
sending one or more first signals from multiple reference radios at multiple locations to a portable radio;
receiving one or more second signals from the portable radio at the multiple reference radios at multiple locations;
determining, with a control logic, a signal flight time between the portable radio and each of the multiple reference radios;
calculating, in real-time with the control logic, a distance from the portable radio to the respective location of each reference radio based at least in part on the signal flight time between the portable radio and the respective reference radio;
determining one or more bounding areas, with the control logic, wherein each bounding area is centered on a corresponding one of the respective locations for the reference radios and has a radius that is at least as great as the calculated distance of the portable radio from the corresponding one of the respective locations;
determining, with the control logic, an intersecting area of the one or more bounding areas;

determining, in real-time with the control logic, that the portable radio is located at any position inside the intersecting area;

identifying, with the control logic, equipment that is inside the intersecting area; and sending instructions from the control logic to the identified equipment to inhibit operation of the identified equipment in response to determining that the portable radio is located inside the intersecting area.

15. The method of claim 14, wherein providing instructions from the control logic to the identified equipment to inhibit operation of the identified equipment in response to determining that the portable radio is located inside the intersecting area comprises providing instructions to inhibit the operation of a robotic unit.

16. The method of claim 14 further comprising:

determining, with the control logic, that at least one reference radio of the multiple reference radios is not able to at least one of: (1) send the one or more first signals or (2) receive the one or more second signals; and providing instructions from the control logic to the identified equipment to inhibit operation of the identified equipment in response to determining that the at least one reference radio is not able to at least one of: (1) send the one or more first signals or (2) receive the one or more second signals.

17. The method of claim 14, further comprising:

identifying equipment, with the control logic, that is within a predetermined distance of the intersecting area; and providing instructions from the control logic to the identified equipment to inhibit operation of the identified equipment within the predetermined distance of the intersecting area in response to determining that the portable radio is located inside the intersecting area.

18. The method of claim 14, wherein the portable radio is configured to receive a first signal from a first reference radio and to provide a second signal to the first reference radio after a predetermined response delay from receiving the first signal.

19. The method of claim 14, wherein determining the signal flight time between the portable radio and each of the multiple reference radios with the control logic comprises determining a round-trip flight time.

20. The method of claim 14, further comprising:

providing instructions from the control logic to the identified equipment to allow operation of the identified equipment in response to determining that the portable radio is no longer located inside the intersecting area.

* * * * *